G. McGREGOR & G. VOLL.
Sash-Lock.
No. 6,693. Reissued Oct. 11, 1875.
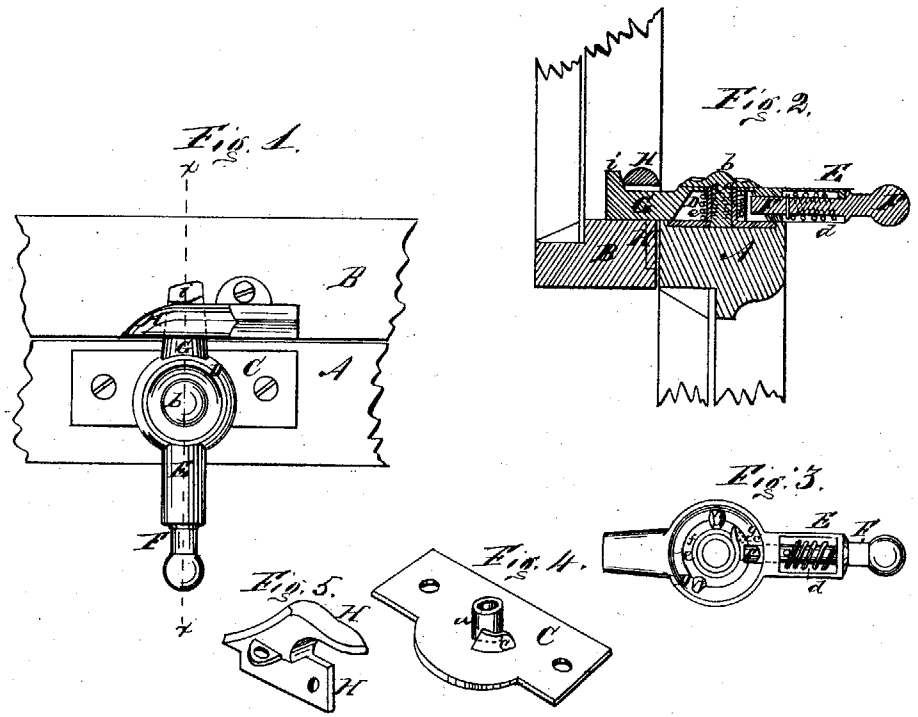
Witnesses
Phillips Abbott.
Barm Higham
Inventor
Hopkins & Dickinson Mfg Co
H. C. Dickinson Treas
N. PETERS, PHOTO-LITHOGRAPHER, WASHINGTON, D. C.

UNITED STATES PATENT OFFICE.

GEORGE McGREGOR AND GEORGE VOLL, OF CINCINNATI, OHIO, ASSIGNORS, BY MESNE ASSIGNMENTS, TO THE HOPKINS & DICKINSON MANUFACTURING COMPANY, OF NEW YORK CITY.

IMPROVEMENT IN SASH-LOCKS.

Specification forming part of Letters Patent No. 88,318, dated March 30, 1869; reissue No. 5,253, dated January 21, 1873; reissue No. 6,693, dated October 11, 1875; application filed August 10, 1875.

*To all whom it may concern:*

Be it known that GEORGE McGREGOR and GEORGE VOLL, of Cincinnati, Ohio, did invent certain new and useful Improvements in Sash-Fasteners; and that the following, taken in connection with the drawings, is a full, clear, and exact description thereof.

In the drawings, Figure 1 is a plan or top view of the contrivance as a whole. Fig. 2 is a vertical section through the same as applied to a window-sash. Fig. 3 is a plan of the bottom of the vibrating lock-lever and its bolt and spring. Fig. 4 is a perspective of the base-plate; and Fig. 5 a perspective view of the hook or striking-plate.

Prior to the date of this invention many kinds of sash-locks have been used or described. Among them one described in English Letters Patent, dated July 26, 1843, No. 9,614, and another in Letters Patent of the United States, dated May 11, 1858.

In the former of these a bolt was secured to the vibrating lock-lever in such a manner that it could be moved to and fro in the line of the lever; and in the latter a bolt moving perpendicularly to the lock-lever was mounted thereon. In both, the bolts, when shot, prevented the lock-lever from being swung from the locking position until the bolt was retracted from a nick depression or socket formed in the striking plate or hook. Both prevented the lock-lever from being swung by means of a knife, or thin piece of metal, inserted from the outside between the sashes.

The improvement herein described upon these sash-fasteners consists in arranging the catch-segment, by which the bolt shoots upon the base-plate on which the lock-lever is pivoted.

Window-sashes shrink or wear. So do the wooden grooves in which they slide. Moreover, the sashes can never be a tight fit in the grooves, and consequently it is difficult to keep the base-plate and its lock-lever and the striking plate or hook always in the same relative position. Therefore, the bolt cannot always shoot into its socket when the latter is formed on the hook or striking-plate. When the socket is on the same plate upon which the lever is mounted this difficulty is avoided. In the English patent before referred to an attempt has been made to avoid this difficulty by forming several depressions on the hook, so that the bolt may enter one where it cannot be brought opposite another.

In the drawings, the lock-lever is represented at E G. A lip, *i*, may, for greater security, and in order to draw the sash-rails together, be formed on one end thereof. On the lock-lever, and so mounted as to slide in the line thereof, is the bolt F, with its knob or handle, and a spring, *d*, which shoots it. This lock-lever is mounted upon the base-plate C, which is provided with a hollow stud, *a*. This stud is entered into a hole in the lock-lever, and a rivet, *b*, secures the lever to the base-plate, the result being that the lever is attached to, but may be turned on, the base-plate. A projection, *c*, rises up from the base-plate. When the lever is at right angles with the position shown in Figs. 1 and 2 the end of the bolt rests against the vertical face. When the lever is shoved into the position shown in Figs. 1 and 2 then the end of the bolt is shot past the end of the projection toward the pivot of the lever by its spring, and when it is shot the lock-lever is fastened, and cannot be turned until the bolt is retracted. The catch-segment, which receives the bolt when shot, being, as thus described, on the base-plate upon which the lever is pivoted, it is evident that the bolt, which is mounted upon the lever, will always shoot by the segment when the lever is in the proper position, and that no derangement of the relative position of the two sashes can effect this result. This result does not depend upon any special construction or form of the lever, or special form or construction of bolt, or manner of mounting the bolt on the lever, but upon the construction in which the lever carrying the bolt is pivoted upon the same base-plate that supports the catch-segment for the bolt.

In order to render the manipulation more convenient there is applied to the contrivance a coiled spring, *e*, one end of which, *f*, bears against a stud, *h*, in a cavity formed in the lever, and the other end, *g*, of which bears against one end of the projection *c*. This spring always tends to throw the lever away from its locked position. Consequently, when the bolt is pulled out of its place behind the catch-segment this spring throws the lever into a position at right angles to that represented in Figs. 1 and 2, and holds it there.

What is claimed as the invention of GEORGE McGREGOR and GEORGE VOLL is—

A vibrating lever, provided with a bolt, in combination with a striking-plate or hook and with a catch-segment, behind which the bolt can pass, formed upon the plate upon which the lever is pivoted, the whole constituting a sash-fastener, and the parts enumerated in the claim being and operating substantially as specified.

Witness the hand of the said HOPKINS & DICKINSON MANUFACTURING COMPANY, by FREDERICK Z. DICKINSON, its treasurer, duly thereunto authorized this 6th day of August, 1875.

HOPKINS & DICKINSON MFG. CO.,
By F. Z. DICKINSON, *Treasurer*.

Witnesses:
BERN. T. VETTERLEIN,
PHILLIPS ABBOTT.